Oct. 5, 1926.

A. S. J. STOVALL

GUIDE BEARING

Filed July 11, 1924    2 Sheets-Sheet 1

1,602,288

WITNESSES

INVENTOR
A. S. J. Stovall

ATTORNEYS

Patented Oct. 5, 1926.

1,602,288

UNITED STATES PATENT OFFICE.

ALBERT SIDNEY JOHNSTON STOVALL, OF ELBERTON, GEORGIA.

GUIDE BEARING.

Application filed July 11, 1924. Serial No. 725,451.

This invention relates to bearings and has particular reference to a guide bearing which is especially designed for use in connection with the lower end of the vertical shaft of a water wheel.

So far as is known, it has heretofore been the practice to place guide bearings for this purpose either within the wheel casing or penstock, and it is obvious that the bearing is therefore subjected to the full pressure of the head of water acting upon the water wheel, thereby resulting in the forcing of sand, grit, mud, or other foreign matter into the spaces between the shafting and bearing. It thus follows that the bearings are rapidly worn out, requiring frequent removal and resetting which entails untold expense and necessitates the shutting down of the plant during repairs.

It is, therefore, an object of the present invention to overcome the above recited objections and disadvantages by providing a guide bearing for this purpose which is positioned outside of the water wheel casing or penstock, in order to relieve the bearing of the crushing pressure produced by the head of water whereby the only pressure to which the bearing is subjected is the head of the tail water which in no instance is very great.

As a further object the invention contemplates a guide bearing for water wheel shafting provided with a water tight casing and container for excluding the water and foreign matter from the bearing and journal and to provide means for receiving and maintaining a supply of lubricant for said parts.

The invention furthermore comprehends an oil guide bearing for water wheel shafting which provides means for facilitating the adjustment of the bearing within the discharge tube of the water wheel and from the exterior of its water tight casing and container.

Another object of the invention is to provide in connection with a bearing of the character set forth means for introducing and discharging oil from the casing or container of the bearing, and a means for withdrawing or draining the casing or container of dirty oil, water or other foreign matter.

As a still further object the invention comprehends in a submerged guide bearing of the character set forth, means for approximately balancing the outward pressure of the oil within the oil casing by the pressure of the water, or when not under water by the pressure of the air outside of the casing.

The invention furthermore aims to provide in a guide bearing submerged in water and encased by an oil receptacle, means for permitting of free circulation of the water outside of the casing whereby the bearing and oil are cooled thereby.

As a still further object the invention resides in the provision of a bearing of the character set forth which is comparatively simple in its construction, inexpensive to manufacture and install, and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1:
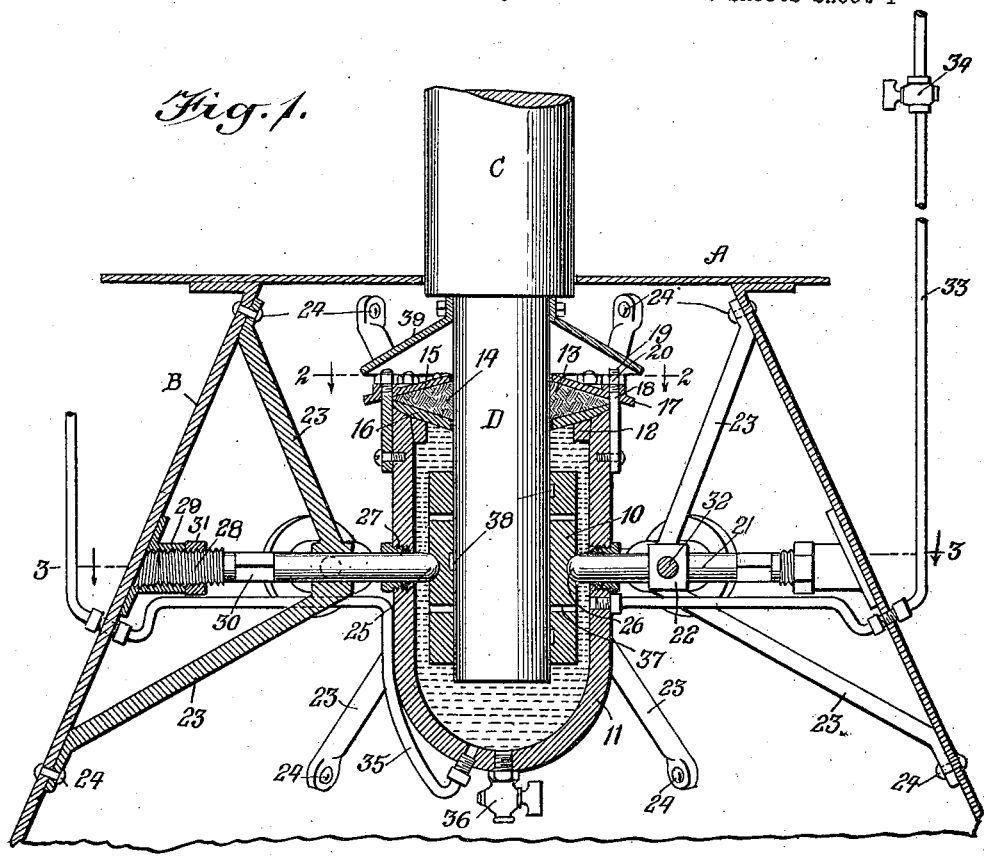
Figure 1 is a vertical sectional view through a bearing constructed in accordance with the invention.
Figure 2:
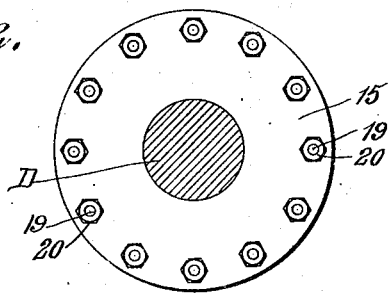
Fig. 2 is a detail horizontal sectional view taken approximately on the line 2—2 of Fig. 1.
Figure 3:
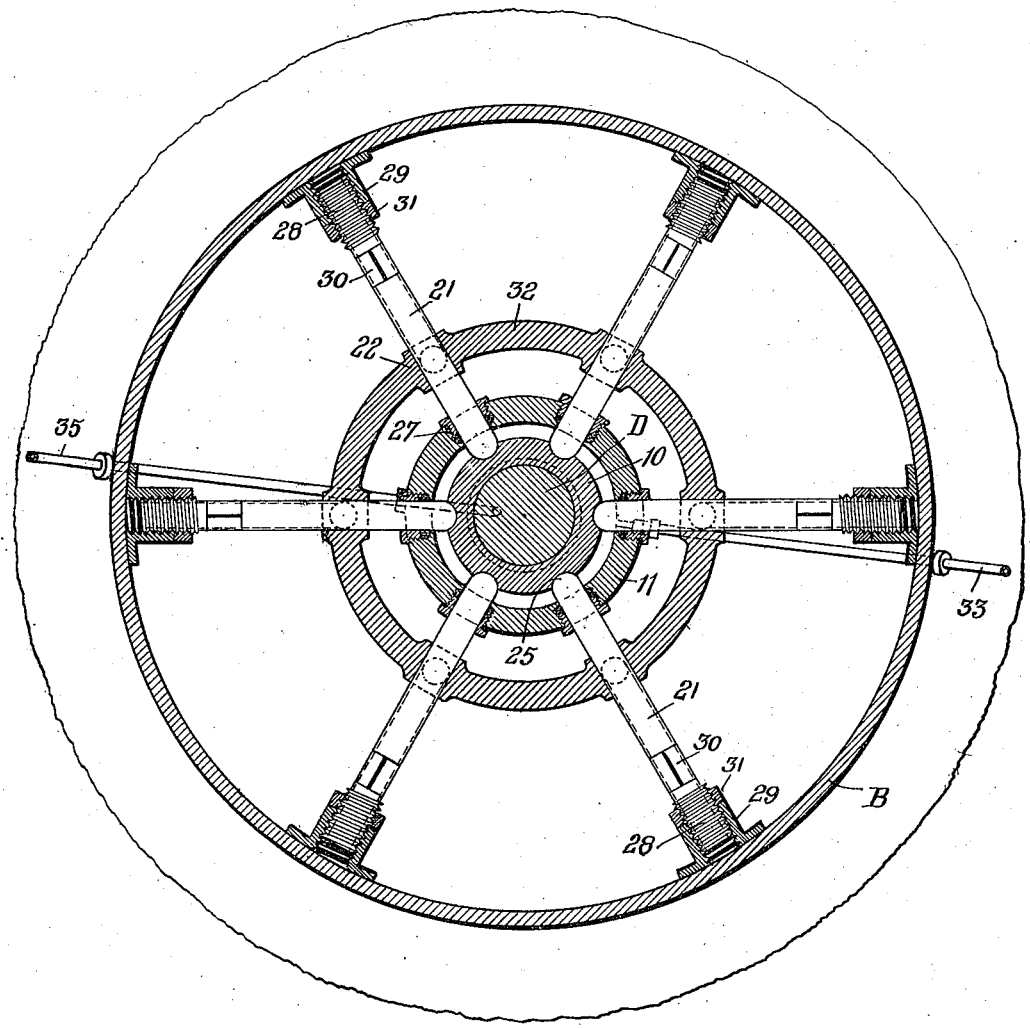
Fig. 3 is a similar horizontal sectional view taken approximately on the line 3—3 of Fig. 1.

Referring to the drawings by characters of reference, A designates the bottom plate of a water wheel casing which has connected therewith the usual draft tube B. In the present instance the water wheel shaft C is extended below the water wheel runner through an opening in the bottom plate A and the extended lower end D is of reduced diameter to constitute a journal.

The bearing constituting the present invention includes a sleeve 10 which is housed within a casing and receptacle 11 which serves also as an oil reservoir. The casing 11 is closed at its lower end and is provided with an open upper end having an inwardly extended annular rim 12. A packing gland 13 which also constitutes a cover is adapted to be seated over the upper open end of the casing and reservoir and said gland is centrally apertured as at 14 to receive therethrough the extended reduced portion D of the water wheel shaft, which also extends through the bearing sleeve 10. Specifically the gland 13 includes upper and lower plates 15 and 16, the former being of greater diameter than the latter and provided with a laterally extending rim 17 having bossed openings 18. To the upper end of the casing 11 a plurality of vertically upstanding threaded stems 19 are provided which extend through the bossed openings 18 and receive thereover nuts 20 for advancing and retaining the plates 15 and 16 toward each other and the gland 13 against the upper open end of the casing. In order to provide means for supporting the reservoir in the casing 11 and to further provide means for adjusting the bearing sleeve 10, the journal D and shaft C relative to the casing 11, a plurality of radial arms 21 are employed. The arms 21 are supported for radial movement in supporting or bearing brackets 22 the angularly disposed legs 23 of which are riveted or otherwise secured as at 24 to the inside of the draft tube B. The inner ends 25 of the arms 21 are of semi-spherical formation to engage in complementary shaped sockets 26 in the outer periphery of the sleeve 10. The said inner ends of the arms extend through packing glands 27 in the side walls of the casing 11. In order to provide means for effecting radial inward or outward movement of the arms 21 upon rotation thereof, the outer ends 28 thereof are threaded and engaged in threaded socket members 29 attached to the inner face of the draft tube B. To facilitate the rotation of the arms 21 by means of a suitable wrench or tool the said arms are provided adjacent the threaded outer ends with a multi-faced portion 30 and for the purpose of locking the arms in radially adjusted position binding or jam nuts 31 are carried by the threaded outer portions 28 of the arms and are adapted to bind against the inner ends of the socket members 29.

In order to brace the bearing brackets 22, the same are preferably made as a part of a ring or annulus 32 which encircles the casing 11.

An oil supply pipe or conduit 33 leads from a suitable source of supply to the oil reservoir through the casing 11 and said supply pipe is provided with a controlling valve 34. To provide means for gaging the oil within the reservoir or casing 11 an oil outlet pipe 35 is provided which leads from the lower closed end of the casing 11 upwardly to a point within a view of the operator. The lower closed end of the casing and reservoir 11 is provided with a drain cock 36 for the purpose of withdrawing dirty oil sediment or other foreign matter from the reservoir. The bearing sleeve 10 is provided with a plurality of radial oil feed openings 37 and is formed on its inner face with the usual spiral oil groove 38. A sand guard apron 39 is secured to the journal D at its juncture with the shaft C and the same overlaps the upper end of the reservoir or casing 11 to deflect sand, dirt or other sediment away from the gland 13.

In use and operation of the bearing, the reservoir defined by the casing 11 is normally maintained with a full supply of oil or other lubricant so friction between the bearing sleeve 10 and journal A is reduced to an absolute minimum. In the installation of the bearing the arms 21 are radially adjusted to properly align and maintain the shaft and journal so that wear by the journal and bearing sleeve 10 is avoided. As hereto set forth the bearing is usually submerged in water and therefore the water serves to cool the casing 11 and a lubricant or oil therein as well as the journal and bearing sleeve 10.

I claim:

1. A journal guide bearing for the shaft of a water wheel which includes the usual draft tube, comprising a bearing sleeve, a closed water tight casing therefor constituting a lubricant reservoir and into which the journal axially extends, a packing gland through which the journal extends, and radially disposed packing glands in the casing, means extending through the latter packing glands, into the casing and engaging the bearing sleeve for adjusting the same laterally with respect to the casing, and a connection between said means and the draft tube of the water wheel, for supporting the casing and bearing sleeve therefrom.

2. A journal guide bearing for the shaft of a water wheel which includes the usual draft tube, comprising a bearing sleeve, a closed water tight casing therefor constituting a lubricant reservoir and into which the journal axially extends, a packing gland through which the journal extends, and radially disposed packing glands in the casing, a plurality of rods extending through the latter packing glands, into the casing and engaging the bearing sleeve for adjusting the same laterally with respect to the casing and a threaded connection between said means and the draft tube of the water wheel for supporting the casing and bearing sleeve therefrom, and for moving the rods radially upon rotation thereof to obtain the lateral adjustment of the sleeve.

3. A journal guide bearing for the shaft of a water wheel which includes the usual draft tube, comprising a bearing sleeve, a closed water tight casing therefor constituting a lubricant reservoir and into which the journal axially extends, a packing gland through which the journal extends, and radially disposed packing glands in the casing, a plurality of rods extending through the latter packing glands, into the casing and engaging the bearing sleeve for adjusting the same laterally with respect to the casing and a threaded connection between said means and the draft tube of the water wheel for supporting the casing and bearing sleeve therefrom, and for moving the rods radially upon rotation thereof to obtain the lateral adjustment of the sleeve and means carried by the draft tube of the water wheel, for guiding and bracing the adjusting rods in their movement.

4. A journal guide bearing for the shaft of a water wheel which includes the usual draft tube, comprising a bearing sleeve, a closed water-tight casing therefor constituting a lubricant reservoir and into which the journal axially extends, a packing gland through which the journal extends, radially disposed packing glands in the casing, means extending through the latter packing glands into the casing and engaging the bearing sleeve for adjusting the same laterally with respect to the casing, a connection between said means and the draft tube of the water wheel for supporting the casing and bearing sleeve therefrom, and a guard apron secured to the journal at a point exterior of the casing and overlying the upper open end of the casing for deflecting sand, dirt, or other foreign matter laterally therefrom.

ALBERT SIDNEY JOHNSTON STOVALL.